G. C. SNYDER.
STUD MEMBER FOR SNAP FASTENERS.
APPLICATION FILED APR. 21, 1915.
1,205,049.
Patented Nov. 14, 1916.
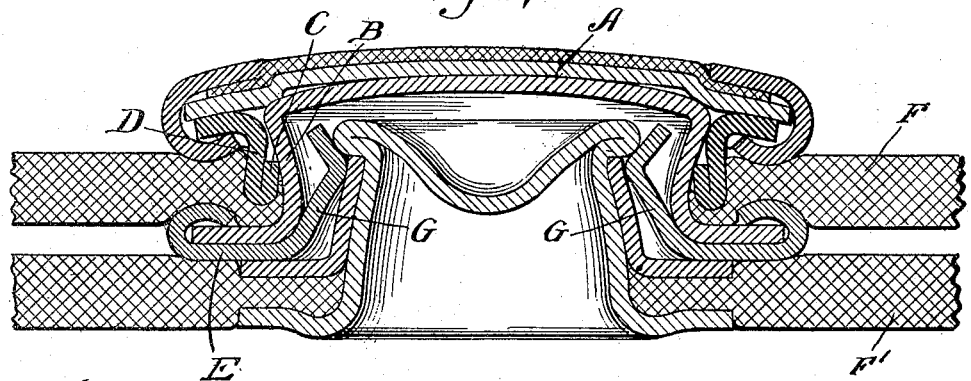
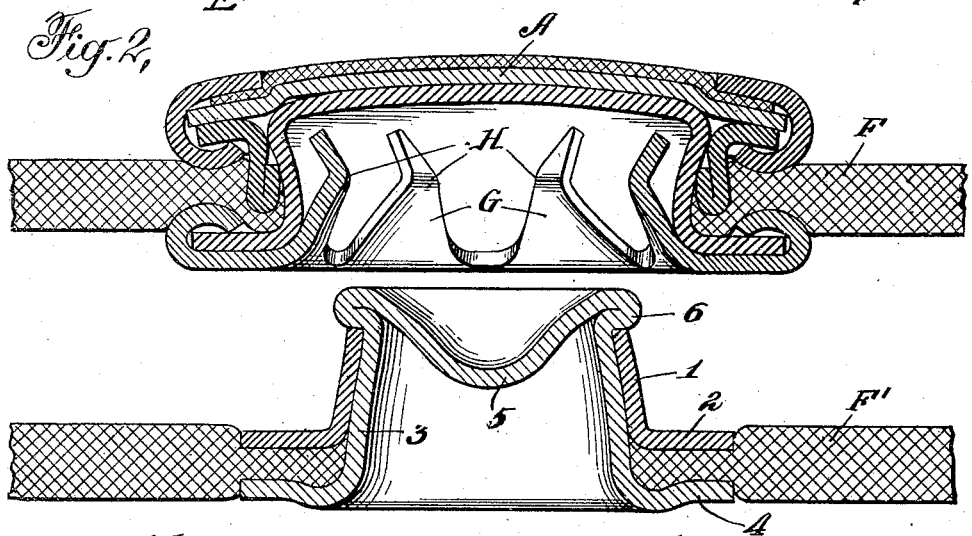
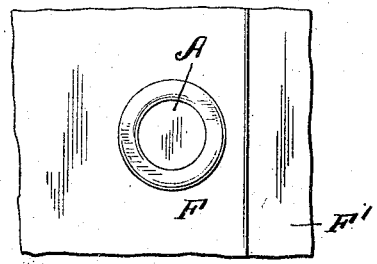
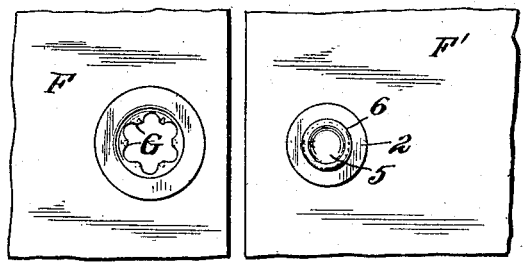
Inventor
George C. Snyder
By his Attorneys

UNITED STATES PATENT OFFICE.

GEORGE C. SNYDER, OF NEW YORK, N. Y.

STUD MEMBER FOR SNAP-FASTENERS.

1,205,049.  Specification of Letters Patent.  Patented Nov. 14, 1916.

Application filed April 21, 1915. Serial No. 22,742.

*To all whom it may concern:*

Be it known that I, GEORGE C. SNYDER, a citizen of the United States, residing at New York, county of New York, and State of New York, have invented certain new and useful Improvements in Stud Members for Snap-Fasteners; and I do hereby declare the following to be a full, clear, and exact description of the invention, such as will enable others skilled in the art to which it appertains to make and use the same.

This invention relates to snap fasteners, and has for its object to provide an improved stud member especially designed for use in combination with a socket member, the stud-receiving space of which is limited.

When snap fasteners are used on articles which have to be laundried, it is especially desirable to make the socket and stud members lie as close to the fabric as possible, so that they will not be so liable to damage. This, of course, tends to limit the stud-receiving space of the socket member, and it is, therefore, essential that the stud member be so constructed that it may properly coöperate with a socket member whose stud-receiving space is thus limited. Furthermore, when the socket member is mechanically attached to the fabric, a great deal of the space which could be used for stud-receiving purposes, if the socket member were attached to the fabric by sewing, must be utilized for the accommodation of the necessary interlocking parts. For this reason, also, the stud-receiving space in certain types of socket members is limited, and, therefore, it is necessary that the stud member for coöperation with socket members of this type should be constructed accordingly.

A further object of the invention is to provide an improved stud member which is mechanically attached to the fabric in a simple, yet effective manner, and which is not likely to become damaged by laundrying, due to its shape and the manner in which it is reinforced.

The invention is illustrated in the accompanying drawing, in which:—

Figure 1 is a vertical section showing the improved stud member inserted in a socket member of the type above referred to, both of the members being secured to a portion of fabric; Fig. 2 is a vertical section corresponding to Fig. 1, but showing the stud member separated from the socket member; Fig. 3 is a top plan view of the socket member; and Fig. 4 is a plan view showing the stud and socket members each applied to a portion of fabric, the socket member being viewed from its under side.

Referring to the drawing, it will be seen that the type of socket member herein illustrated requires the use of a stud member constructed substantially as hereinafter described, because the head A of the socket member lies relatively close to the fabric F to which it is attached. In the present instance, the socket member is attached to the fabric F by expanding a tubular thimble B behind an inturned flange C of a tubular shank portion D. The thimble B carries a disk E provided with a plurality of spring fingers G inclined toward the axis of the socket member and projecting into the interior thereof. The extremities of the spring fingers G are bent backwardly to provide a circular series of slightly rounded shoulders H to engage with a portion of the stud member, as will hereinafter appear. A socket member so formed and attached to the fabric, in the manner above described, is not capable of receiving a relatively large bulbous stud member. This is true for the further reason that the spring fingers G must be made relatively long to possess the maximum degree of resiliency, and there is, therefore, not room between the extremities of the spring fingers and the head of the socket member to accommodate a relatively large head on a stud member. With these and other conditions in view, the stud member is constructed as follows: An outer sleeve 1, having a basal flange 2, is telescoped over a hollow tubular thimble 3, which is also provided with a basal flange 4. The fabric F', to which the stud member is secured, is gripped between the basal flanges 2 and 4 of the sleeve and thimble, respectively. Preferably, the fabric is first perforated and the thimble 3 inserted through the perforation of the fabric, the outer sleeve 1 being then telescoped over the thimble 3. The head portion of the thimble is then upset to lock the sleeve and thimble together and to firmly grip the fabric F' between the clamping flanges 2 and 4.

The manner in which the head of the thimble is upset constitutes an important part of the present invention, and is accomplished as follows: The head of the thimble is made concave, as indicated at 5, so that when the rounded plunger of any suitable assembling mechanism descends to "set" the stud member, that portion of the tubular wall of the thimble which extends above the sleeve 1 will be folded and upset to form the radially projecting bead 6. It is essential that this upsetting action be sufficient to cause the bead 6 when completed to extend radially beyond the sleeve 1, so as to provide a radial projection behind which the shoulders H of the spring fingers may engage. It is also essential that the walls of the sleeve 1 be substantially straight and substantially parallel to the force required to upset the thimble 3.

As will be obvious from an inspection of Figs. 1 and 2, a stud member is produced by the foregoing operations which does not possess a relatively large bulbous head for coöperation with the spring fingers of the socket member, but that only a relatively small projection 6 is provided for engagement by such spring fingers. Furthermore, the concaved head 5 of the stud member makes the same of less height than it would be if the head portion were bulged outwardly. Such outward bulging of the head of the stud is necessary in stud members which are attached to the fabric by expanding a thimble inside of the stud member, but the use of the outer sleeve 1, over the top edge of which the thimble is collapsed, permits such outward bulging or bulbous formation to be dispensed with.

The substantially straight walls of the outer sleeve 1 not only take and withstand strains incident to "setting" of the stud member, but also reinforce the stud member against compression forces incident to laundrying, as it is obvious that said walls being disposed substantially at right angles to the base of the stud member will withstand large compression forces acting substantially parallel to said walls.

The folding of the metal of the walls of the thimble 3 to provide the radially projecting bead 6 causes a smooth rounded surface on the stud member to be presented to the shoulders H of the spring fingers, and, therefore, neither the stud member nor the socket member possesses raw, sharp edges which will in any way injure the co-acting parts of the other member. It will also be seen from the foregoing that the upsetting of the thimble occurs only at the place where it is necessary. In other words, as the thimble is expanded over the upper edge of the outer sleeve 1, the radially projecting portion 6 is spaced from the base of the stud member, the spacing corresponding to the length of the spring fingers of the socket member. The rest of the stud member, or that part not specifically intended for coöperation with the shoulders H of the spring fingers, need not be deformed in any way, the round bulbous formation of the head on most stud members being a needless deformation, as it is obvious that the stud does not have to co-act throughout its entire length with the socket member. This feature of providing only a relatively small deformed portion 6, as distinguished from the formation of a round bulbous head extending nearly to the base of the stud member, permits of the use of the external sleeve 1, the walls of which serve to reinforce the stud against compression forces, as above stated. This sleeve could not well be used if a bulbous head were formed on the thimble and still have the stud lie as close to the fabric as in the present instance.

Although the stud member herein shown and described is designed especially for use in combination with a socket member of the type referred to, it is obvious that it may be used in combination with the socket members of other types, and, therefore, I do not wish to limit myself to the particular use herein stated.

What I claim is:—

1. A stud member for use with a socket member of snap fasteners, comprising an outer sleeve having a basal flange, an inner tubular thimble also having a basal flange to coöperate with the first-named flange in gripping the fabric to which the stud member is secured, that portion of the thimble extending above the upper edge of said sleeve being upset and folded upon itself to form a relatively flat bead-like projection extending radially beyond the outer upper edge of said sleeve a sufficient distance to coöperate with a stud-retaining part of the socket member.

2. A stud member for snap fasteners, comprising an outer sleeve having a basal flange, an inner tubular thimble also having a basal flange to coöperate with the first-named flange in gripping the fabric to which the stud member is secured, that portion of the thimble extending above the upper edge of said sleeve being upset and folded upon itself to form a relatively flat bead-like projection extending radially beyond the outer upper edge of said sleeve, the walls of said sleeve being substantially straight throughout their length and substantially parallel to the force required to upset the thimble, for the purpose described.

3. A stud member for snap fasteners, comprising an outer sleeve having walls which are substantially straight throughout their length and also having a basal flange, an inner tubular thimble also having a basal flange to coöperate with the first-named flange in gripping the fabric to which the stud member is secured, the thimble having a relatively flat radially-projecting portion extending beyond the upper outer edge of said sleeve.

4. A stud member for snap fasteners, comprising an outer sleeve having a basal flange, an inner tubular thimble also having a basal flange to coöperate with the first-named flange in gripping the fabric to which the stud member is secured, that portion of the thimble extending above the upper edge of said sleeve being upset and folded upon itself to form a relatively flat bead-like projection extending radially beyond the outer upper edge of said sleeve, the head of the thimble being concaved toward the base of the stud member, and the walls of said sleeve being substantially straight throughout their length, for the purpose described.

In testimony whereof I affix my signature.

GEORGE C. SNYDER.

Copies of this patent may be obtained for five cents each, by addressing the "Commissioner of Patents, Washington, D. C."